No. 739,104. PATENTED SEPT. 15, 1903.
R. OSTREJKO.
PROCESS OF OBTAINING CARBON OF GREAT DECOLORIZING POWER.
APPLICATION FILED JAN. 4, 1901.
NO MODEL.
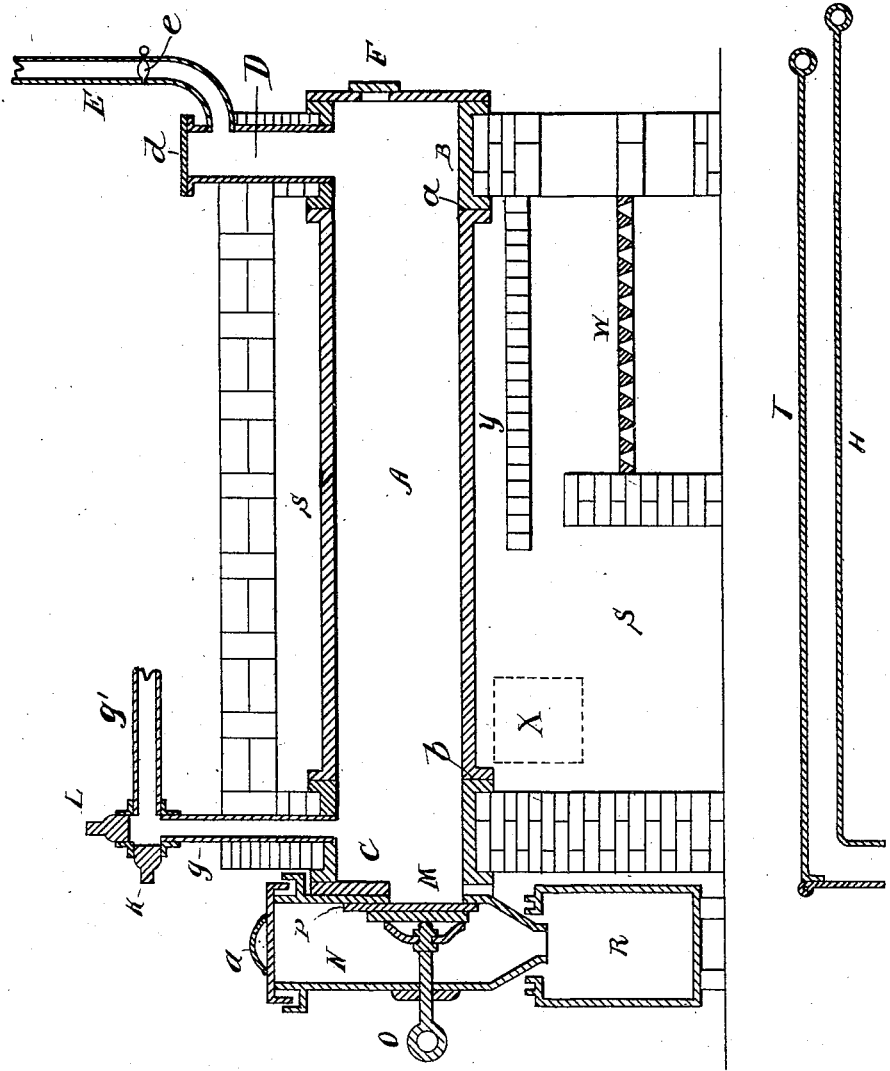
Witnesses:
J. D. McMahon.
G. S. Noble.
Inventor,
Raphael Ostrejko
by B. Singer,
Att'y.

No. 739,104. Patented September 15, 1903.

UNITED STATES PATENT OFFICE.

RAPHAEL OSTREJKO, OF SATKUNY, RUSSIA.

PROCESS OF OBTAINING CARBON OF GREAT DECOLORIZING POWER.

SPECIFICATION forming part of Letters Patent No. 739,104, dated September 15, 1903.

Application filed January 4, 1901. Serial No. 42,144. (No specimens.)

*To all whom it may concern:*

Be it known that I, RAPHAEL OSTREJKO, a subject of the Emperor of Russia, and a resident of Satkuny, near Janowo, district of Kovno, Russia, have invented a Process of Obtaining Carbon of Great Decolorizing Power, of which the following is a specification.

The object of the present invention is to produce carbon of great decolorizing powers by a highly-economical process of distillation.

Carboniferous substances of vegetable origin are exposed in a pulverulent, comminuted, and damp condition to dry distillation effected rapidly and energetically at a high temperature with concurrent action of superheated steam or carbonic acid, or both together, supplied in large quantities. The steam or carbonic acid employed should likewise be superheated in pipes at a high temperature and led from the pipes into the retort at this temperature. By virtue of this condition almost all fluid and heavy gaseous products are disintegrated into vapors and gases which do not react injuriously upon the charcoal product— such as hydrogen, carbon monoxid, light carbureted hydrogen, and the like—so that the dry distillation takes place in the presence of innocuous gases, while in the methods formerly known it was carried out in a space containing spirits of methyl, wood-vinegar, tar, and similar vapors. After the carbonizing of the organic substances is completed a current of steam (or carbonic acid) at a high temperature should be passed through the carbon for a period about the same as the duration of the dry distillation or slightly longer. Then the carbon will be cooled and according to circumstances either used immediately or first rinsed with clean water or with acid (for example, muriatic acid) and water and afterward dried, or it may be for a second time raised to glowing heat without access of air. The necessary steam and carbonic acid can either be directly led to the substances to be carbonized or compounds are mixed with these substances, such as will in the course of the dry distillation taking place under the conditions characterized produce steam and (or) carbonic acid in considerable quantities. These general methods are illustrated in the following characteristic examples: Pieces of wood about one centimeter thick, measured in the direction of the grain, (or peat and the like,) are permeated with moist steam or soaked in water, then are placed in a closed retort heated to a high temperature, into which superheated steam (carbonic acid) at a high temperature is led in abundance through pipes heated to said temperature. At the same time the influx of superheated steam is regulated in such manner that the steam and gases escaping from the retort during the process of distillation will when kindled burn with a pale non-luminous flame, showing that the products of distillation have been decomposed into hydrogen, carbon monoxid, light carbureted hydrogen, and the like. Since thereby part of the carbon of the distillates passes over into carbonic acid $$(C + H_2O = CO_2 + 4H)$$

and as this latter at the temperature mentioned reacts with the carbon residue of the wood producing monoxid of carbon, $$(C - CO_2 = 2CO),$$

the quantity of carbon in the retort is gradually diminished. When it is diminished to from eight to ten per cent. of the wood used, a product is yielded which, after it has been rinsed with clean water and afterward dried, decolorizes sugar-cane juice and sirups about ten times more effectually than the ordinary bone-charcoal. On the other hand, if the superheated steam is permitted to act further upon the carbon the mass continues to waste away; but its decolorizing strength increases.

In the manufacture of carbon according to the process herein described five factors play the principal part: first, the degree of comminution of the material to be carbonized; second, its humidity; third, the quantity of steam introduced into the retort; fourth, the temperature of the dry distillation; fifth, the duration of the action of the superheated steam during and after the termination of the dry distillation.

If the wood is used in pieces not sufficiently small—for instance, in the form of billets— the product, in spite of all remaining requirements being fulfilled, is a carbon which possesses only very slight decolorizing powers. The wood must be comminuted so that the reagent (steam or carbonic acid) can more easily penetrate into the interior of every little piece. The dampening of the substance, which is accomplished by means of ordinary steam or water previous to the dry distillation, has the object of increasing the volume of the material, (wood.) By the rapid action of the highly-superheated steam the surface of the wood is instantly carbonized, so that the exterior carbon shell formed in this way hinders the contraction of the wooden block, the interior of which is still to be completely carbonized, and in consequence thereof produces very porous carbon, which permits a complete penetration of steam or carbonic acid. If an insufficient quantity of steam is used, the necessary decomposition of the products of distillation does not take place. The gases escaping from the retort burn, when kindled, with a bright flame, rich in soot, and carbon of only low decolorizing powers is the result. If the temperature remains too low during the dry distillation, the steam and carbonic acid exercise no effect, and carbon is produced of very meager decolorizing intensity. If, on the other hand, it is too high—for instance, that of white heat—the carbon is consumed with extraordinary rapidity, since it forms carbon monoxid with the superheated steam or carbonic acid. If superheated steam in superabundance is permitted to act at normal temperature (at about 800° Fahrenheit) during a very long time, the quantity of carbon diminishes very considerably. Therefore to obtain carbon of great decolorizing power and in paying quantities the above directions must be strictly followed.

While in Example 1 steam or carbonic acid are led into the material to be carbonized in already-prepared condition, the examples further given refer to those cases in which these reagents are contained in the admixed substances and are first developed from them in the course of the dry distillation.

Example 2: If an intimate mixture (of, for example, fifty parts) of pulverized washed peat, sawdust, and the like with (for example fifty parts) raw-beet chips washed in lye, in moist condition and not in a moderate quantity, is brought very rapidly to a temperature of about 800° Fahrenheit, the dry distillation conducted at this temperature produces carbon of great decolorizing capacity, which latter can be yet further increased by rinsing with acid and water. Similar results follow when pulverized peat and the like is moistened with a solution containing one-half per cent. of starch and then exposed in moderate quantities to a rapid dry distillation at the temperature of about 800° Fahrenheit. In both of these cases the material used does not readily give up its water. This is a very important characteristic, for if the retort-wall is heated to about 800° Fahrenheit there will still be water in the interior of the material, which gradually evaporates, and the steam developed is superheated by contact with the wall. In this manner the special case occurs wherein evaporation, superheating, and dry distillation take place in the same apparatus. On the other hand, in the use of a readily-drying substance—as, sawdust, for instance—prepared by moistening with a starch solution only very feebly decolorizing carbon is produced, because here the hygroscopic water evaporates readily and at a low temperature, so that very little superheated steam is obtained.

Example 3: An intimate mixture of fine sawdust or coal-dust or powdered washed peat and the like (say one hundred parts) with slime of defecation, (say one hundred to one hundred and fifty parts,) slaked lime, (say fifty to seventy-five parts,) chalk, (about fifty to seventy-five parts,) or the like is slightly moistened with water. The dough-like mass obtained is thoroughly kneaded and then put through a rapid dry distillation in a temperature of about 800° Fahrenheit, using moderate charges. The carbon produced is adapted for use in branches of manufacture where the lime contained therein will have no injurious effect—for instance, in defecation and saturation of sugar-cane juice. The use of these carbon residues, which contain lime, is of great advantage in the sugar industry, since three different operations are united together in a single one. If the product is used during the second saturation, a higher decolorizing effect is secured and sugar-cane juice of higher qualities appear than is the case with the three operations used to-day—that is, the second and third saturation and the purification with bone-carbon. Here it is to be observed that the carbonic acid (and other acids) of the sugar-juice serves to still further increase the decolorizing capacity of the carbon. The fact that this increase of the decolorizing powers of the carbon in Case 3 is due to the effect of superheated steam and carbonic acid is evident from the following considerations: Slaked lime has the property of absorbing water, which is expelled at high temperature. Besides, this substance absorbs carbonic acid from the products of distillation in the early stages of distillation and passes into calcic carbonate; but this compound decomposes at the temperature of about 800° Fahrenheit into lime (CaO) and carbonic acid, ($CO_2$,) the latter of which reacts upon the carbon.

Example 4: Wood in small pieces or any other carboniferous substance is covered with a solution of medium concentration of about twenty-five per cent. strength of calcium acetate—$Ca(C_2H_3O_2)_2$—and boiled until the salt begins to separate. The material undergoes while still moist a rapid dry distillation at a temperature of about 800° Fahrenheit. If it is desired to further increase the decolorizing power of the carbon product, it must be rinsed in acid and water. In this case, again, steam and carbonic acid perform the principal part, since calcium carbonate is formed by the decomposition of calcium acetate, which gives off carbonic acid when exposed to a temperature of 800° Fahrenheit. In the commercial production crude wood-vinegar saturated with lime may be efficiently used for this purpose; also pyroligneous acid. The material to be treated is subjected to destructive distillation in moderate charges only, because with considerable quantities the carbonization proceeds in an incomplete manner. Before the inner layers of the filling material are sufficiently warmed the carbon already produced in the outer layers may be entirely consumed by contact with the steam (carbonic acid) generated. Besides, the inner layers are insufficiently heated on account of the carbonization of the outer. In consequence they dry slowly.

Carbon that has been used may have its decolorizing powers restored by undergoing the same process by which it was produced; but in this case less steam and carbonic acid are used.

In restoring to used carbon its decolorizing powers care must be taken not to allow the carbon to be consumed too far. Some of it will have to disappear in the process; but when the amount has reached eighty-five per cent. of the original weight put into the retort the fires must be drawn from under the retorts. The carbon can be used as it then is or may be improved by exposing to further action of steam and carbon dioxid without external heat; also by cleaning with acid and rinsing in water. The carbon may also be restored by simply exposing it to the reducing-gases without externally heating retort. If small pieces of ordinary wood-charcoal are exposed to the prolonged action of superheated steam at the temperature of about 800° Fahrenheit, the decolorizing power of this carbon increases slowly, while, on the other hand, its mass diminishes gradually.

The decolorizing power of the prepared carbon (among others, bone-charcoal) can be increased not only by the use of directly-supplied superheated steam or carbonic acid, but also by saturating the carbon before the dry distillation with organic or inorganic compounds which generate steam or carbonic acid at high temperatures.

The feature that the reducing agents, steam and $CO_2$, are in most cases developed as products of the decomposition of the carboniferous substances under the influence of oxygen compounds exhibits a very important characteristic of the present invention, because in this respect the dry distillation takes place under peculiar conditions, which never have been used until now. The point is that the benefit of introducing innocuous gases into the retort consists only in this—that the quantity of harmful gases (tar, wood-vinegar) already present is not increased from outside sources; but it is also not decreased, so that during the whole process the carbon remains in contact with these gases, while in the present case all these gases are decomposed into innocuous chemically-inert gases, such as hydrogen and carbonic oxid.

Having now described my invention, what I claim, and desire to secure by Letters Patent, is—

1. The process of producing carbon of great decolorizing power consisting in subjecting comminuted carboniferous substances, in a copiously-moistened condition and in small lots, to a rapid distillation without access of air, at a high temperature, concurrently exposing the carboniferous substances and the products of their distillation to superheated carbon dioxid.

2. The process of producing carbon of great decolorizing power consisting in subjecting comminuted carboniferous substances, in a copiously-moistened condition and in small lots, to a rapid distillation without access of air, at a high temperature, concurrently exposing the carboniferous substances and the products of their distillation to superheated carbon dioxid and superheated steam and continuing for a period, at least as long as that of distillation, the supply of said gas after the carbonization of the material acted upon is completed.

3. The process of producing carbon of great decolorizing power consisting in subjecting comminuted carboniferous substances, in a copiously-moistened condition and in small lots, to a rapid distillation without access of air, at a high temperature, concurrently exposing the carboniferous substances and the products of their distillation to superheated carbon dioxid and continuing for a period, at least as long as that of distillation, the supply of said gas after the carbonization of the material acted upon is completed, purifying the carbon product with acid.

4. The process of producing carbon of great decolorizing power consisting in subjecting comminuted carboniferous substances, in a copiously-moistened condition and in small lots, to a rapid dry distillation without access of air, at a high temperature, concurrently exposing the carboniferous substances and the products of their distillation to superheated carbon dioxid and continuing for a period, at least as long as that of distillation, the supply of said gas after the carbonization of the material acted upon is completed, purifying the carbon product with acid, and washing it in clean water.

5. The process of producing carbon of great decolorizing power consisting in subjecting comminuted carboniferous substances, in a copiously-moistened condition and in small lots, to a rapid dry distillation without access of air, at a high temperature, concurrently exposing the carboniferous substances and the products of their distillation to superheated carbon dioxid and continuing for a period, at least as long as that of distillation, the supply of said gas after the carbonization of the material acted upon is completed, purifying the carbon product with acid, and washing it in clean water, and then again glowing it without access of air.

6. The process of producing carbon of great decolorizing power consisting in subjecting cellulose, in a copiously-moistened condition and in small lots, to a rapid distillation without access of air, at a high temperature, concurrently exposing the cellulose and the products of distillation to superheated carbon dioxid and continuing for a period, at least as long as that of distillation, the supply of said gas after the carbonization of the material acted upon is completed.

7. The process of producing carbon of great decolorizing power consisting in subjecting an intimate mixture of comminuted carboniferous substances in a copiously-moistened condition and in small lots to a rapid dry distillation without access of air at a high temperature, concurrently exposing the carboniferous substances and the products of their distillation to a carbonic gas evolved in the early stages of distillation from the mixture to be carbonized, and superheated directly after being formed.

In testimony whereof I have hereunto set my hand in presence of two witnesses.

RAPHAEL OSTREJKO. [L. S.]

Witnesses:
BOLESLAW KONADYNSKY,
M. ROSCELSKY.